(12) United States Patent
Gotovac (10) Patent No.: US 7,930,807 B2
(45) Date of Patent: Apr. 26, 2011

(54) CLEAT HOLDING DEVICE

(76) Inventor: Lovro Gotovac, Woodbridge (CA)

( * ) Notice: Subject to any disclaimer, the term of this patent is extended or adjusted under 35 U.S.C. 154(b) by 24 days.

(21) Appl. No.: 11/781,487

(22) Filed: Jul. 23, 2007

(65) Prior Publication Data
US 2009/0025189 A1    Jan. 29, 2009

(51) Int. Cl.
*F16G 11/04* (2006.01)
(52) U.S. Cl. ............................................. 24/136 R
(58) Field of Classification Search ............. 24/136 R, 24/136 L, 115 M; 403/211
See application file for complete search history.

(56) References Cited

U.S. PATENT DOCUMENTS

| | | | |
|---|---|---|---|
| 4,217,847 A | 8/1980 | McCloud | |
| 4,278,042 A | 7/1981 | Lindquist | |
| 4,355,441 A | 10/1982 | Hall | |
| 4,453,486 A | 6/1984 | Harken | |
| 4,569,507 A * | 2/1986 | Robert | 254/246 |
| 4,620,499 A | 11/1986 | Slemmons | |
| 4,899,423 A | 2/1990 | Randall | |
| 4,956,897 A | 9/1990 | Speedie | |
| 5,133,111 A | 7/1992 | Brown | |
| 5,548,873 A | 8/1996 | Macias | |
| 5,675,872 A | 10/1997 | Emery | |
| 6,003,210 A * | 12/1999 | Facey et al. | 24/130 |
| 6,058,574 A * | 5/2000 | Facey et al. | 24/136 R |
| 6,269,523 B1 | 8/2001 | Benoit | |
| 6,505,384 B1 | 1/2003 | Renton et al. | |
| 2003/0115723 A1 * | 6/2003 | Shuey | 24/136 R |

FOREIGN PATENT DOCUMENTS

GB    2210517 A * 6/1989

* cited by examiner

*Primary Examiner* — James R Brittain (57) ABSTRACT

The present invention is a holding device for a rope, cable, wire and the like hereafter referred to as rope and more particularly a sliding cam rope cleat comprised of a holding device, a slideable cam member controlled by a sliding handle and two passageways therethrough for the rope member. While the sliding handle is engaged in the open position, the cam member will not be resident in the first passageway and a rope member may be freely inserted and drawn. However once the sliding handle is engaged in the clamping position, the cam member will partially obstruct the first passageway and the tapered serrated bottom of the cam member will engagingly grip and secure the inserted rope member. Subsequently, the holding device provides for a quick release of the secured rope member by returning the sliding member to its first open position thereby disengaging the tapered serrated cam member for the inserted rope member. In addition, the holding device offers a second passageway which serves as a storage receptacle for any slack in the rope member.

20 Claims, 7 Drawing Sheets

CLEAT HOLDING DEVICE

FIELD OF THE INVENTION

This invention relates to a holding device for a rope, cable, wire and the like, and more particularly to a sliding cam rope cleat having a slideable cam member for selectively locking and releasing the sliding cam and in turn locking and releasing a

BACKGROUND OF THE INVENTION

A broad range of cleat devices have been developed for holding ropes, cables and wires and the like hereafter referred to as rope. The purpose of these cleat devices is to permit the holding of a rope between two points in a secure manner as to overcome tensional resistance.

One such cleat device includes a cleat having a cam with a passageway adapted to receive a rope. The cleats function by allowing a rope to be freely drawn through a passageway in one direction and conversely pinching the rope if drawn in the opposite direction.

U.S. Pat. No. 5,548,873 issued on Aug. 27, 1996 to Macias and relates to an improved anti-locking cleat for rope, cable, and the like including a housing, a rotatable generally spherically-shaped engaging member, a biasing means and a positioning means. The housing includes an elongated base, a first passageway generally circular in cross-section and extending traverse to the length of the base. A chamber is formed in the base and is disposed adjacent one side of the first passageway. A length of rope is drawn through the first passageway in either a first or oppositely directed second direction. The rotatable engaging member is pivotally mounted within the chamber and is positionable at either a first or a second position. The member is biased into the first position by the biasing means and is manually positionable, via the positioning means, into the second position. When the member is in the first position it partially blocks the passageway and engagingly contacts the rope such that the rope may be freely drawn through the passageway in the first direction but not in the second direction. When the member is in the second position it does not block the passageway and does not engagingly contact the rope, such that the rope may be freely pulled through the passageway in either the first or the second directions. The device disclosed is complicated in design and whose function is based on the rotational motion of a cam device with the assistance of a spring.

Lindquist is the owner of U.S. Pat. No. 4,278,042 which issued on Jul. 14, 1981. This patent relates to a cam cleat designed to secure sheets, halyards, lines etc. introduced into it on boats. The can cleat includes two parts moving respectively, towards and away from each other, the faces of these parts which face each other being serrated, and these parts being so designed that they adopt a fixed position and a free position and are so pivoted that when they rotate in the same direction they either move towards each other or away from other. These parts are spring-loaded in such a way that the first of the parts strives to adopt the free position and the other of these parts strive to adopt the fixed position. Further, the first of these parts can be locked in the fixed position by an eccentric control device. The first part is pivoted about a point in such a way that when rotated from the fixed position to the free position its serrations tend to detension a line in the cam cleat. The device disclosed is comprised of two cam members and a cam control device release lever and requires the assistance of multiple torsion springs and pressure springs to function.

Brown is the owner of U.S. Pat. No. 5,133,111 which issued on Jul. 28, 1992. This patent relates to a device including a base plate having a rope receiving surface portion along and against which the rope travels, a cam pivotally connected to the base plate, and a plurality of protrusions extending generally radially outwardly from the surface of the cam. The device disclosed is complicated in design and whose function is based on the rotational motion of a cam device about a pivot point.

McCloud is the owner of U.S. Pat. No. 4,217,847 which issued on Aug. 19, 1980. This patent relates to a self-release cam cleat and further relates to a rope holding device including an improved cam cleat useful on a sailboat for maintaining sail ropes taut. The improved cam cleat contains two cam-type jaws to grip the rope, one of which has a serrated or tooth-like surface for gripping, while the other has a smooth-gripping surface which permits easy rotation of the smooth cam member to the release position. The smooth cam member has an arcuate face with a radius of curvature for the gripping surface substantially greater than the smooth face of the release surface adjacent it. Consequently, when the smooth surface release cam is pivoted so that the retained rope is slipped from the smooth gripping surface to the smooth releasing surface, the rope is automatically released without though need for the operator to exert a force on the rope to pull it away from the cam cleat as is usually done. This cam design lacks a covering of housing, such that the rope may be accidentally pulled from the passageway thereby disengaging the cleat mechanism and releasing the rope.

U.S. Pat. No. 6,505,384 B1 issued to Renton et al on Jan. 14, 2003. This patent relates to an apparatus for gripping a flexible elongated member including a housing having a base, a lever pivotally connected to the housing, and a gripping component having a gripping member. The lever is pivotally connected to the housing, and the gripping component is mounted so as to be movable relative to the housing. The gripping component, housing, and lever are arranged such that manipulation of the elongated member so as to contact the lever will cause the lever and gripping component to move relative to each other, thereby gripping or releasing the elongated member. The device disclosed is complicated in design and whose function is based on the rotational motion of a cam device about a pivot point.

Thus there is a need for a cleat device that minimizes the number of internal moving parts while maintaining the inherent protection of a housing device.

SUMMARY OF THE INVENTION

In accordance with one aspect of the present invention a holding device for a rope, cable, wire and the like (hereafter rope) in an attached housing is provided.

In accordance with another aspect of the present invention a holding device comprising a housing means with a passage therethrough, a cam member and a sliding cam member disposed within said housing means for movement between a first position with the cam member out of the passage and a second position where the cam member partly obstructs the passage.

In accordance with yet another aspect of the present invention a holding device for a rope making use of a sliding cam member that is capable of movement in a substantially linear direction is provided.

Another aspect of the present invention relates to a holding means comprising a first member and a second member engageable with the first member in such a manner as to define a cavity for the cam member.

In accordance with yet another aspect of the present invention a holding device and method that permits the insertion and drawing of a rope article in the first direction, thereby engaging the serrated gripping edge of the sliding cam member in such a manner as to permit movement of the rope in the first direction but to oppose movement of the inserted rope in the opposite or second direction.

Yet another aspect of the present invention, relates to a sliding cam member which is engageable by a slideable member that may lock and release the position of the sliding cam and in turn quickly lock and release the inserted rope article.

In accordance with yet another aspect of the present invention a cleat for a rope comprising a first housing member engageable with a second housing member in such a manner as to define a cavity therein; a passageway disposed through the first housing member and communicating with the cavity; a cam member disposed with the cavity for sliding movement between a first position permitting insertion and withdrawal of a rope through the passageway and a second position clamping the rope between the cam member and the first housing member.

DETAILED DESCRIPTION OF THE PREFERRED EMBODIMENT

In the drawings, preferred embodiments of the invention are illustrated by way of example. It is to be expressly understood that the description and drawings are only for the purpose of illustration and as an aid to understanding, and are not intended as a definition of the limits of the invention.

Figure 5:
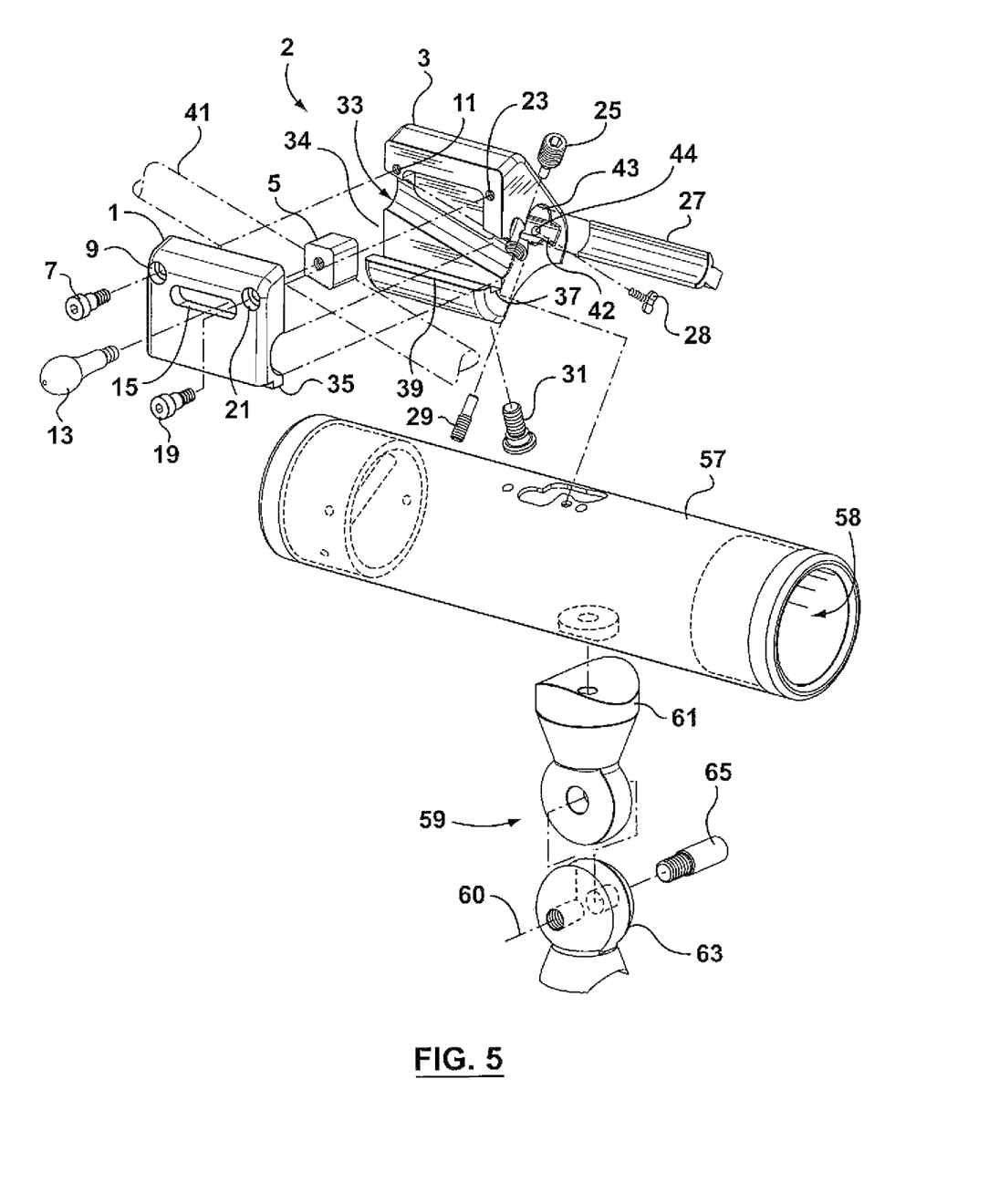
FIG. 5 is an exploded view of the curved bottom holding device.

The present invention can be readily realized in one of two embodiments, a flat bottomed embodiment (see FIG. 1) and a curved bottom embodiment (see FIG. 5).

Figure 1:
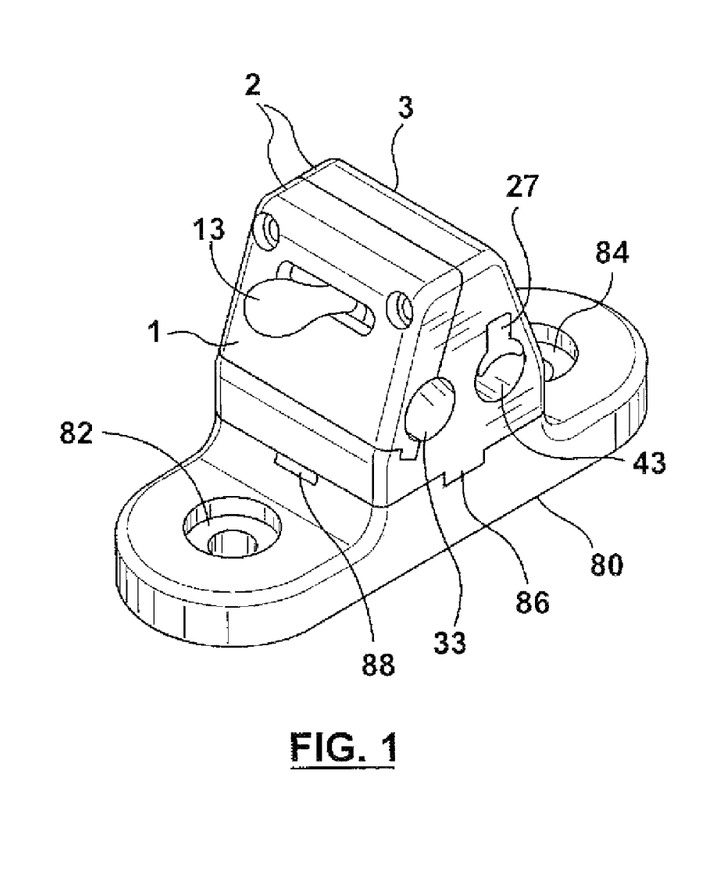
FIG. 1 is a perspective view of the flat bottomed holding device.

FIG. 1 is a perspective view of the flat bottom holding device 2. As further expounded upon, the holding device 2 is comprised of a first housing member 1 and a second housing member 3. The housing members 1 and 3 are fastened together creating a passageway 33 that is adapted to receive the rope member 41. Of special interest in the flat bottomed embodiment is the holding plate 80. The holding plate 80 consists of two crossed channels which intersect in the centre of the plate forming a cross shape 86, 88. The channels 86, 88 engagingly interact with the bottom of the housing member 3 in such a manner as to increase the stability of the entire holding device 2. In addition, due to the crossed nature of the channels 86, 88, the housing member 3 maybe be secured in four different orientations depending on the placement of the housing member 3 within the channels 86, 88. The holding device 2 is also affixed to the holding plate 80 via a threaded hole track 90 (see FIG. 3). The holding plate 80 is also comprised of two apertures 82, 84 to permit the mounting of the holding plate 80 via two screws on a flat surface.

Figure 2:
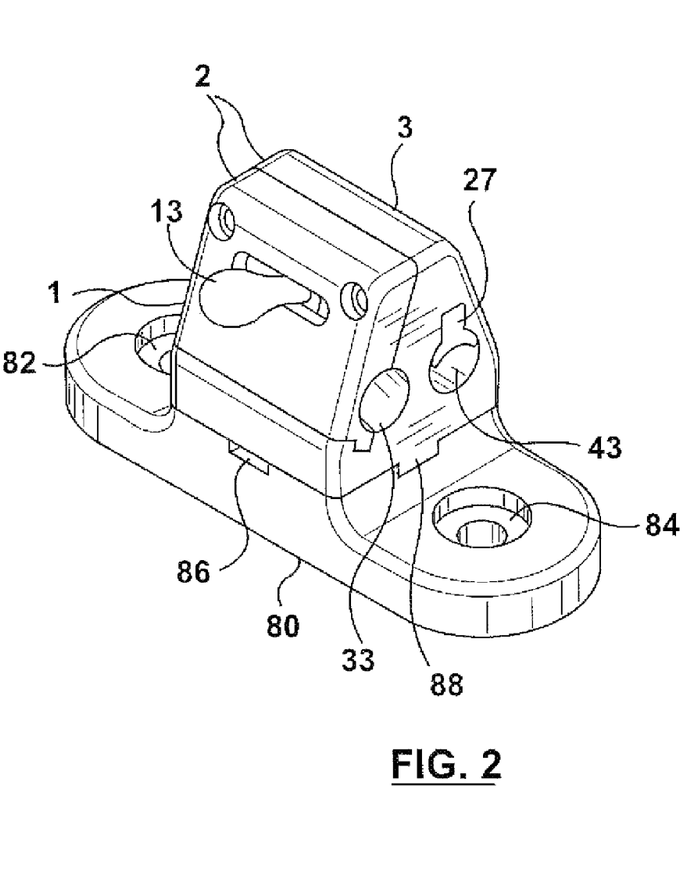
FIG. 2 is a perspective view of the flat bottomed holding device with the holding plate rotated 90 degrees.

FIG. 2 is a perspective view of the flat bottom holding device 2 with the holding plate rotated 90 degrees as compared to FIG. 1. FIG. 2 is similar in nature to FIG. 1 however the holding device 2 is mounted onto the holding plate 80 in the opposite orientation i.e. the housing member 3 is interacting with channel 88 as opposed to channel 86 in FIG. 1.

Figure 3:
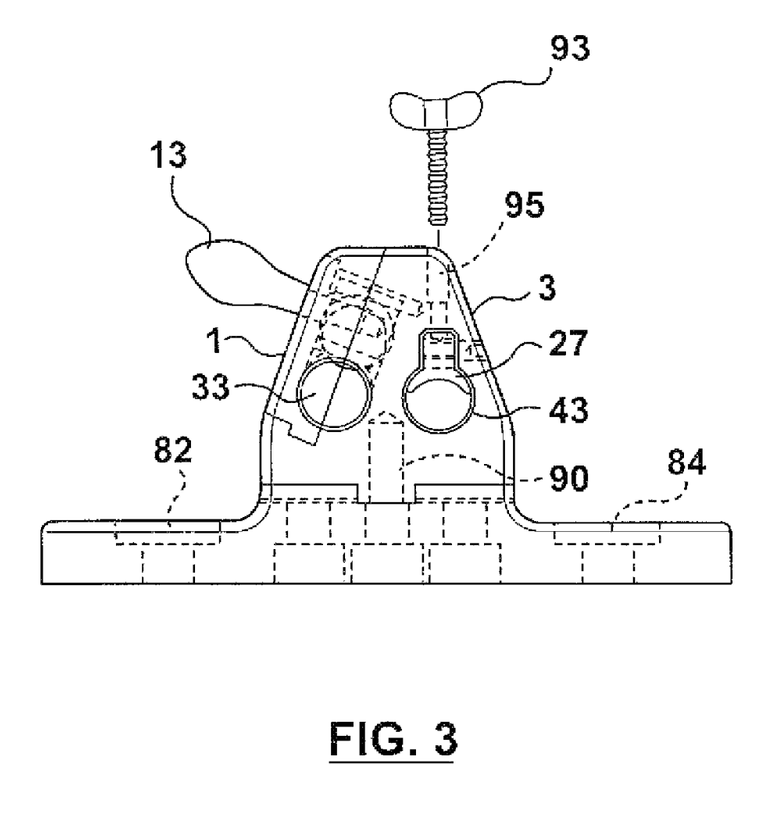
FIG. 3 is a side view of FIG. 1.

FIG. 3 is a side view of FIG. 1. FIG. 3 clearly illustrates the central threaded hole 90 to which fasten the holding plate 80 with the holding device 2.

Figure 4:
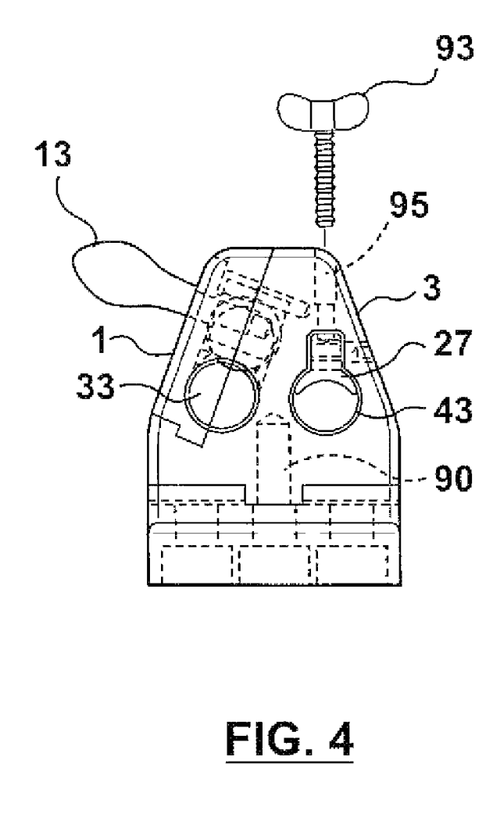
FIG. 4 is a side view of FIG. 2.

FIG. 4 is a side view of FIG. 2 where the flat bottomed holding device with the flat bottom plate is rotated 90 degrees relative FIG. 3. Similar in nature to FIG. 3, FIG. 4 further illustrates the two apertures 82, 84 to permit the mounting of the holding plate 80 via two screws on a flat surface.

FIG. 5 is an exploded view of the curved bottom holding device 2 as mounted on a cylindrical rail 57 illustrated herein. FIGS. 1, 2, 3, 4 and 5 are similar in function, and the following description relates top FIG. 1-5.

The holding device 2 is comprised of a first housing member 1 and a second housing member 3. The housing members 1 and 3 are fastened together creating a passageway 33 that is adapted to receive the rope member 41.

The housing members 1 and 3 when fastened together define an interior cavity 34 which receives a cam member 5. Two holes 9 and 21 are formed in the first housing member 1 and permit two screws 7 and 19 to secure the first housing member 1 with the second housing member 3 by way of bore hole 11 and bore hole 23 disposed at either end of the second housing member 3.

As mentioned the first housing member 1 and the second housing member 3 engage in such a manner as to define a passageway therethrough 33. To assist the engagement between the two housing members, the first housing member includes a lip 35 and the second housing member 3 includes a channel 37 and a ridge 39 that is engageable with the lip 35 from the first housing member 1.

The two housing members define a passageway 33 that is disposed at an acute angle "A" relative to the horizontal. The cam member 5 is disposed within the cavity 33 and can be manipulated by means of a handle 13. The handle 13 is fastened to the cam 5 by way of bore hole 17 and protrudes through a slot 15 disposed in the first housing member 1 as shown. The handle 13 is slideable and free to move in a substantially linear path as dictated by slot 15 between the first position (as shown in FIG. 7B) with the cam member 5 out of the passageway 33 thereby permitting the insertion and withdrawal of the rope 41 and the second position (shown in FIG. 7A) with the cam member 5 obstructing the passageway 33 and thereby clamping the rope 41 between the cam member 5 and the bottom of the passageway 33.

The holding device 2 can include a second passageway 43 transversely formed therethrough for receiving the end of the rope 41. The rope 41 is drawn into the first passageway 33 and can be securely held therein by way of the cam member 5 and its placement within the first passageway 33. The second passageway 43 is predominately an accessory passageway and may be used to house any slack in the rope 41. The second passageway is generally circular in cross section and can include a groove 42 which is adapted to receive an insert 27 as shown. The insert 27 may be acted upon by a screw 28 inserted at 44, which when tightened, causes the insert 27 to dimple and apply pressure on the inserted rope slack 41, thereby securing it in place. In the opposite manner, when the screw 28 is loosened, the pressure on the rope slack 41 is reduced thereby allowing it to be freely removed. It should also be noted that the flat bottomed embodiment of the holding device 2 as shown in FIG. 1, also permits the insert 27 to be acted upon by a screw 93 inserted at 95, however the orientation is adjusted and the insert 27 is mounted on the roof of the second passageway 43. Similarly the screw 93 acts upon the insert 27 along the vertical axis as depicted in FIG. 3.

The cam member 5 can be controlled by the sliding handle 13 on the side of the holding device 2. If the sliding handle 13 is positioned in the open or first position, the cam member 5 is not obstructing the passageway 33 and the rope 41 may be freely drawn therein. If the sliding handle 13 is positioned in the clamping position or the second position, the cam member 5 would partially obstruct the passageway 33 and the tapered serrated edge of the cam member 6 would engage and grip the rope 41 in a secured manner. The secured manner could be described as a self locking manner and by virtue of the sliding handle 13, the holding device also possess a quick release. Once the sliding handle 13 returns to the open position or the first position 53, the tapered serrated edge of the cam member 6 no longer engages the rope 41 and the rope 41 may be freely drawn or freely removed.

In the preferred embodiment, the holding device 2 is mounted to a cylindrical rail 57. To assist the engagement and subsequent fastening of the holding device 2 to the cylindrical rail 57, the bottom surface of the holding device 2 may posses a curved arc that mirrors the curved path of the upper surface of the cylindrical rail 57. Further detailed in FIG. 11 the holding device 2 can be mounted to a rail 57 via three screws 25, 29, 31.

Figure 6:
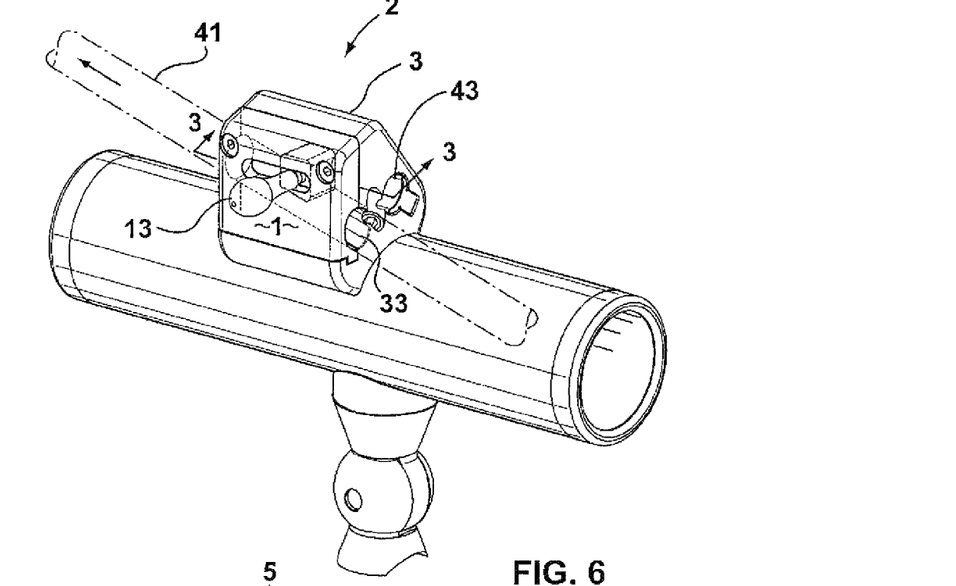
FIG. 6 is a perspective view of the curved bottom holding device.

FIG. 6 is a perspective view of the curved bottom holding device 2; the preferred embodiment of the present invention mounted to a cylindrical rail 57 as illustrated in FIG. 5. FIG. 6 depicts the holding device 2 as a single unit. Both housing members 1 and 3 have come together in such a manner that the channel 37 and ridge 39 disposed on the second housing member 3 engage with the lip 35 disposed on the first housing member 1.

The passageway 33 is clearly visible as the product of the engagement of the first housing member 1 with the second housing member 3. The rope 41 is depicted as being drawn through the passageway 33. It should be noted that the rope 41 is free to be drawn through the first passageway 33 because the sliding handle 13 is in its first position 53 whereby the cam member 5 is largely out of the passageway 33. If the sliding handle 13 were depicted in its second position 51 whereby the cam member 5 is obstructing the passageway 33, the rope 41 could not be freely drawn.

Figure 7A:
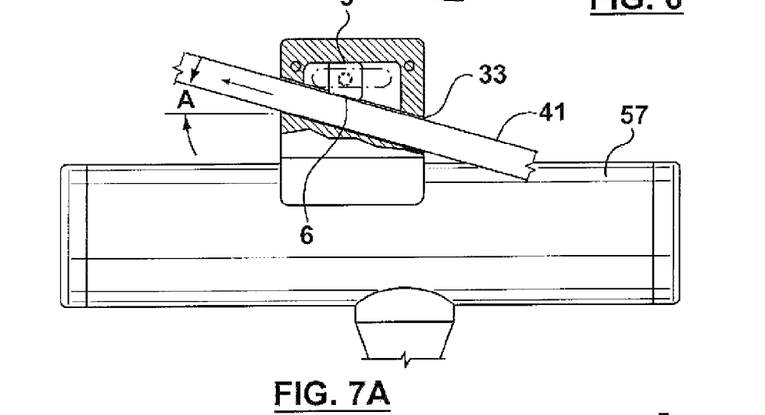
FIG. 7A is a partial cross-sectional view of the curved bottom holding device with the cam in the clamping position.
Figure 7B:
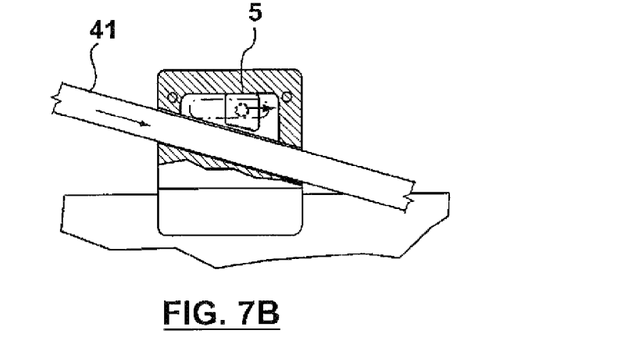
FIG. 7B is a partial cross-sectional view of the curved bottom holding device with the cam in the open position.

FIG. 7A is a partial cross-sectional view of the holding device 2 with the cam member 5 in the clamping position. FIG. 7A depicts the earn member 5 in its second position or the clamped position. The sliding handle 13 (not shown) has been moved to its second position and as a result the cam member 5 is in its second position 51 or the clamped position. Once the cam member 5 is in its second position, the tapered serrated edge of the cam member 6 engages and grips the rope 41 in a secured manner. As depicted in FIG. 7A, the tapered serrated edge of the cam member 6 is disposed in a substantially parallel manner to the axis of the first passageway 33.

FIG. 7B is a partial cross-sectional view of the curved bottom holding device with the cam member 5 in the open position. FIG. 7B depicts the cam member 5 in its first position or open position. The sliding handle 13 (not shown) has been moved to its first position and as a result the cam member 5 is in its first position or the open position. Once the cam member 5 is in its first position 53, the tapered serrated edge of the cam member 6 is no longer capable of engagingly gripping the rope 41 and as a result, the rope 41 is freely capable to be drawn back through the first passageway 33.

Figure 8:
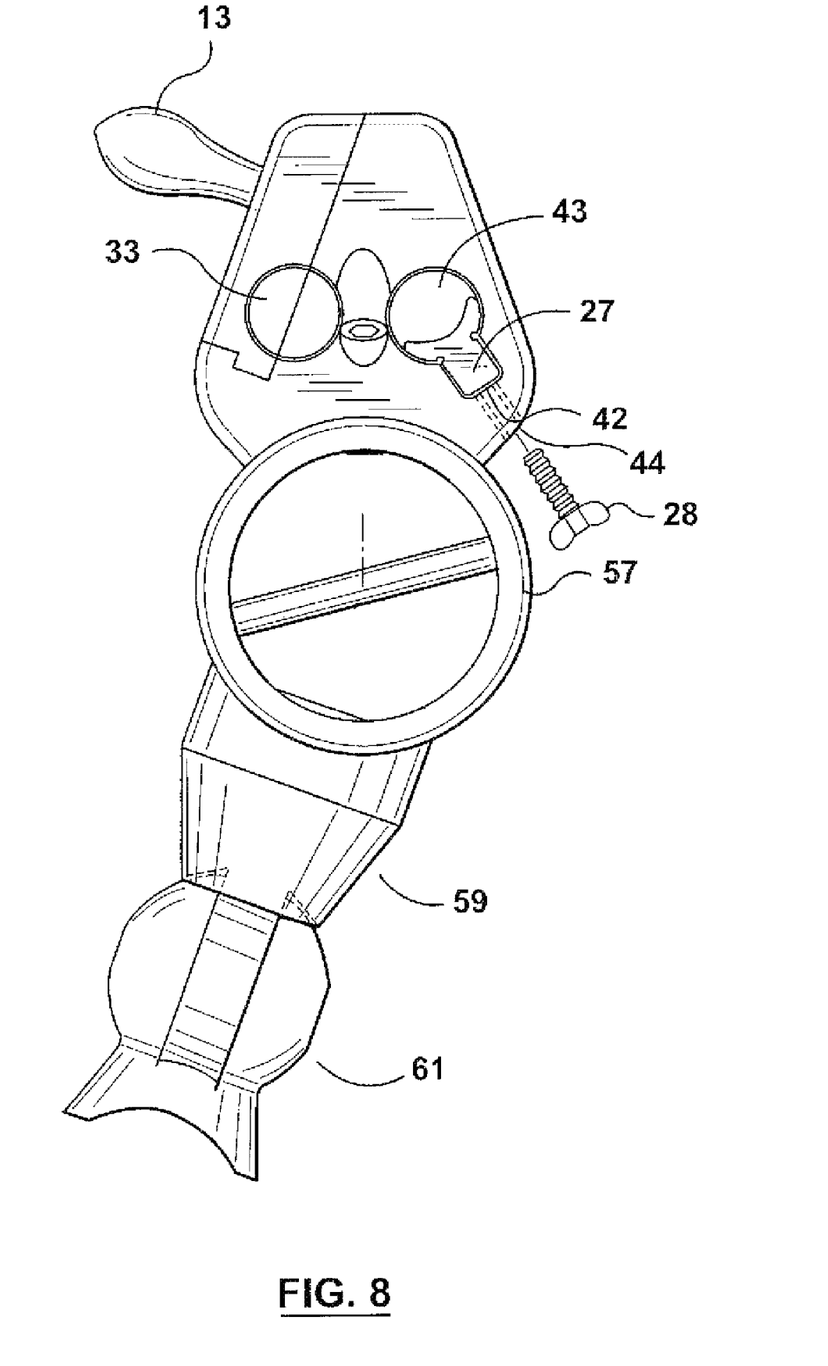
FIG. 8 is a side view of the mounted curved bottom holding device.

FIG. 8 is a side view of the mounted curved bottom holding device. FIG. 8 clearly depicts the sliding handle 13 protruding from the first housing member of the holding device. The engagement between the lip 35 of the first housing member 1 and the channel 37 and ridge 39 of the second housing member 3 is shown. In addition, the two passageways 33, 43 are both clearly displayed.

Figure 9A:
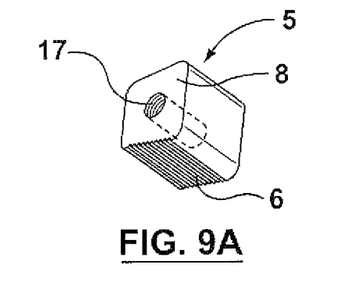
FIG. 9A is a perspective view of the cam.

FIG. 9A is a perspective view of the cam member 5. As depicted, the cam member 5 is a quadrilateral shape with two sides parallel with the vertical 8, 10, a flat top side parallel with the horizontal 12 (not shown) and a tapered serrated bottom 6 with gripping means once the cam member 5 engagingly makes contact with an inserted rope 41 (not shown). The angle of the tapered serrated bottom 6 is disposed in a substantially parallel manner to the axis of the first passageway 33 (not shown). Also visible in FIG. 9A is the threaded bore hole 17 by which the sliding handle 13 engages the cam member 5.

Figure 9B:
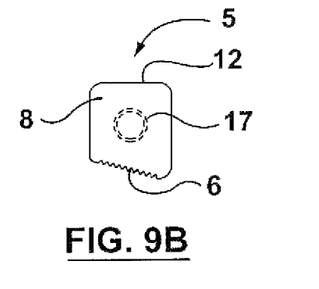
FIG. 9B is a side view of the cam.

FIG. 9B is a side view of the cam member 5. The side view clearly demonstrates the angle of tapered serrated bottom 6 of the cam member 5. Once the cam member 5 is in its second position 51 the tapered serrated bottom 6 engagingly grips the inserted rope 41 (not shown).

Figure 9C:
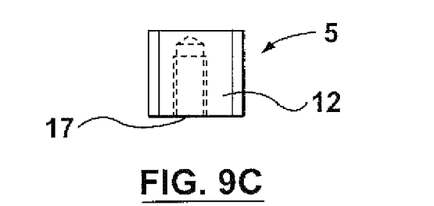
FIG. 9C is a top view of the cam.

FIG. 9C is a top view of the cam member 5. The top view of the cam demonstrates the two sides of the cam member 5 that are parallel with the vertical 8, 10 as well as displaying the flat top side that is parallel with the horizontal 12. In addition, the depth of the bore hole 17 can be viewed.

Figure 10A:
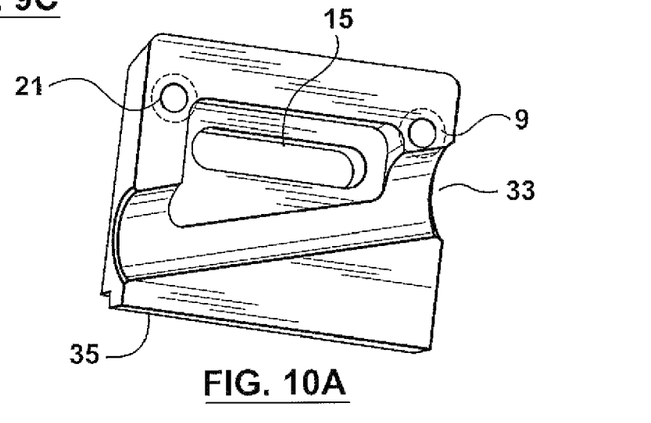
FIG. 10A is an inside perspective view of the first housing member of the holding device.

FIG. 10A demonstrates the portion of the passageway 33 that is formed by the first housing member 1. In addition the view further illustrates the restricted linear path of the sliding handle 13 (not shown) due to its placement in the slot 15.

Figure 10B:
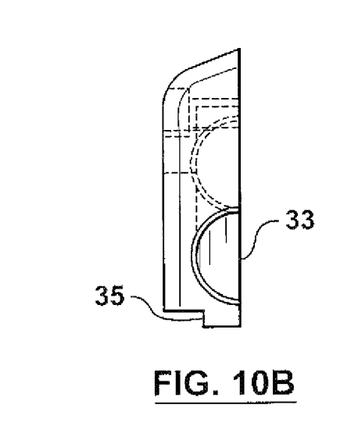
FIG. 10B is a side view of the first housing member of the holding device.

FIG. 10B is a side view of the first housing member 1 of the holding device 2. The side view of the first housing member 1 best illustrates the lip 35 that articulates with the channel 37 and the ridge 39 of the second housing member 3. In addition, the side view further illustrates the acute angle of the passageway 33 that is formed by the two housing members 1, 3.

Figure 10C:
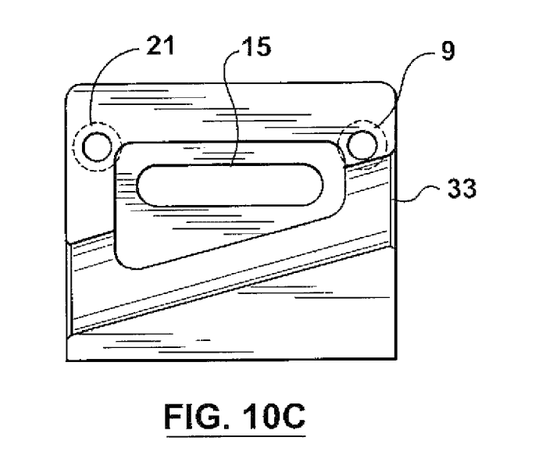
FIG. 10C is an inside view of the first housing member of the holding device.

FIG. 10C shows the first housing member 1 of the holding device 2.

Figure 11:
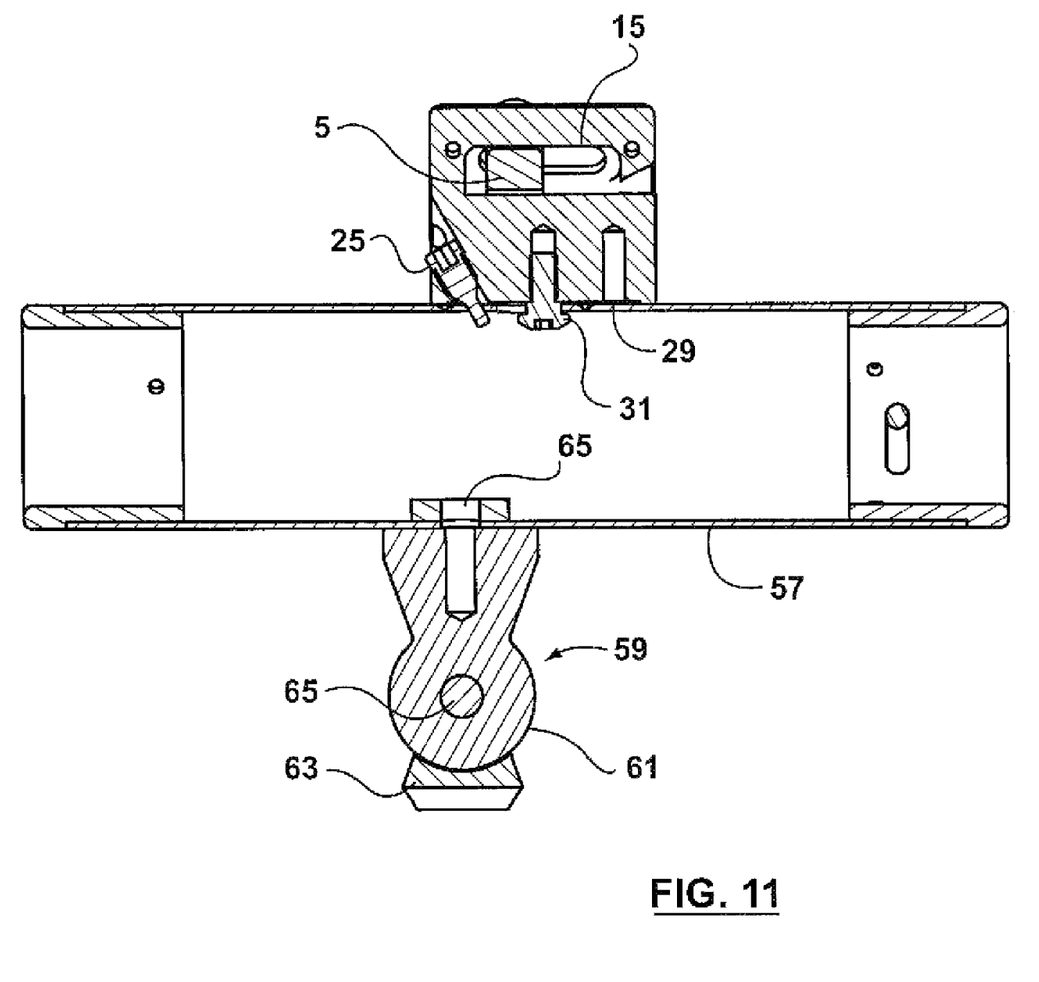
FIG. 11 is a full cross-sectional view of the mounted curved bottom holding device.

FIG. 11 is a full cross-sectional view of the mounted holding device 2. Apart from detailing the substantially linear motion of the cam member 5 due to the sliding aperture 15. FIG. 7 also highlights the mounting of the holding device 2 onto the rail 57 preferred embodiment. The housing device 2 is mounted via three screws 25, 29, 31. Screw 25 bolts the housing device 2 to the rail 57 from the top and screws 29 and 31 fix the housing device 2 to the rail 57 from the inside of the rail 57. In addition, the preferred embodiment depicts the housing device 2 being mounted to a rail 57 and subsequently mounted to a revolute joint 59. As depicted in FIG. 5 and FIG. 11, the revolute joint 59 is comprised of two members 61 and 63 fixed by a screw 65 which engages with threaded hole 60. It addition it should be noted that the rail 57, may be open ended at 58 to permit the insertion of a device such as a fishing rod. The other end (from #58) has a rod extending through the centre to hold the fishing rod in place. However other means could be used to retain the fishing rod handle in the cylindrical holder. The rail 57 would be able to rotate through the range of motion defined by the engagement of members 61 and 63 permitting the fishing rod to be positioned in a desired position.

The housing device 2 may be fastened to an assortment of surfaces; flat surfaces such as a wall or a deck as described in FIGS. 1-4, or curvilinear surfaces such as the preferred embodiment of the rail 57 as described in FIGS. 5-11. Depending on the desired fastening surface, the bottom surface of the housing device 2 may be adjusted accordingly to assist the engagement and fastening of the housing device 2.

Accordingly the present invention describes a cleat for a rope comprising a first housing member 1 engageable with a second housing member 3 so as to define a cavity or passageway 33. In addition the cleat is comprised of a cam member 5 that is disposed within said passageway 33 for sliding movement between a first position 53 and a second position 51 clamping the rope 41 between the cam member 5 and the bottom of the passageway 33 formed by the engagement of the first housing member 1 and the second housing member 3.

Lastly the present invention describes a method for holding a rope with a device having a housing 2 with a passageway 33 therethrough and a sliding cam member 5 disposed in said passageway 33 for sliding movement from a first position 53 out of the passageway 33 for insertion of a rope member 41, to a second position 51 into the passageway 33 thereby engagingly clamp the cam member 5 to the rope member 41, and returning to the first position 53 out of the passageway 33 for removal of the rope member 41 in the passageway 33.

It will be appreciated by those skilled in the art that other variations of the preferred embodiment may also be practised without departing from the scope of the invention.

I claim:

1. A holding device comprising:
   (a) a holding plate having at least two placement means disposed at an angle to one another;
   (b) housing means having a passage therethrough, said housing means adapted to selectively engage with each of the at least two placement means; and
   (c) an unbiased sliding cam member disposed within said housing means for movement between a first position with the cam member out of the passage and a second position where the cam member is in the passage.

2. A holding device as claimed in claim 1 further including control means operable by sliding the cam member between the first and second position.

3. A holding device as claimed in claim 2 wherein the passage is disposed along an axis.

4. A holding device as claimed in claim 3 wherein the housing means comprises:
   (a) a first member; and
   (b) a second member engageable with the first member.

5. A holding device as claimed in claim 4 wherein the first and second members define a cavity for receiving the cam member.

6. A holding device as claimed in claim 5 wherein the passage intersects the cavity.

7. A holding device as claimed in claim 6 for receiving a rope through the passage with the cam member in the first position and for holding the rope with the cam member in the second position.

8. A holding device as claimed in claim 7 wherein the cam member has one tapered edge disposed substantially parallel to the axis of the passage between the first and second positions.

9. A holding device as claimed in claim 8 wherein the tapered edge has gripping means.

10. A holding device as claimed in claim 1 wherein each placement means is a channel and the housing means is formed to selectively engage with one of said channels.

11. A holding device as claimed in claim 1 wherein the housing means has a second passage therethrough disposed along a second axis, and wherein the holding device further comprises an insert disposed longitudinally along the second passage and moveable between a holding position and a releasing position along a third axis substantially perpendicular to the second axis.

12. A cleat for a rope comprising:
   (a) a first housing member engageable with a second housing member, so as to define a cavity having a generally horizontal top edge spaced from a tapered bottom edge;
   (b) a first passageway disposed through the first and second housing member along a first axis and communicating with the cavity, said first axis disposed at an angle relative the top edge;
   (c) a second passageway disposed through at least one of said first housing member and second housing member, said second passageway disposed along a second axis;
   (d) a cam member disposed within the cavity for sliding movement between a first position permitting insertion and withdrawal of a rope through the first passageway and a second position clamping the rope between the cam member and the first passageway; the cam member having a generally horizontal top edge spaced from a bottom edge; the cam member's tapered bottom edge disposed substantially parallel to the first axis between the first and second positions; and
   (e) an insert disposed longitudinally along the second passageway and moveable between a holding position and a releasing position along a third axis substantially perpendicular to the second axis.

13. A cleat as claimed in claim 12 wherein one of the first and second housing members includes a slot disposed generally parallel to the cavity top edge for receiving a handle connected to the cam member, the handle operable to slidingly move the cam member between the first and second position.

14. A cleat as claimed in claim 13 wherein the cam member slidingly moves between the first and second positions in a substantially linear direction.

15. A cleat as claimed in claim 14 wherein the first housing member includes a lip and the second housing member includes a channel and a ridge engageable with the lip from the first housing member.

16. A cleat as claimed in claim 15 wherein the bottom edge of the cam member is disposed at an angle to the top edge of the cam member.

17. A cleat as claimed in claim 16 wherein the cam member is unbiased.

18. A cleat as claimed in claim 12 wherein a groove is formed along said second passageway, said groove adapted to receive said insert.

19. A method of holding a rope with a device having a housing with first and second passageways therethrough, an unbiased sliding cam member disposed in said first passageway, and an insert disposed longitudinally along said second passageway comprising:

(a) sliding the cam member to a first cam position out of the first passageway for insertion of the rope in the first passageway;
(b) sliding the cam member to a second cam position into the first passageway to engage the rope in the first passageway and to clamp the rope in the device;
(c) moving the insert along an insert axis substantially perpendicular to the axis of the second passageway to a first insert position out of the second passageway for insertion of the end of the rope in the second passageway; and
(d) moving the insert along the insert axis to a second insert position into the second passageway to engage the rope in the second passageway.

20. A method as claimed in claim 19 wherein the movement of the cam member is substantially linear.

* * * * *